United States Patent

Krinock

[11] Patent Number: 4,680,778
[45] Date of Patent: Jul. 14, 1987

[54] FAST ACQUISITION CIRCUIT FOR SYNCHRONOUS DIGITAL RECEIVER OPERATING IN WIDEBAND NOISE

[75] Inventor: Jerome V. Krinock, Owensboro, Ky.

[73] Assignee: Motorola, Inc., Schaumburg, Ill.

[21] Appl. No.: 783,132

[22] Filed: Oct. 2, 1985

[51] Int. Cl.⁴ .............................................. H04L 27/06
[52] U.S. Cl. .................................... 375/97; 375/120; 455/265
[58] Field of Search ........................... 375/97, 118, 120; 328/155; 455/258, 260, 265; 329/50, 122, 110, 124

[56] References Cited

U.S. PATENT DOCUMENTS

| | | | |
|---|---|---|---|
| 3,470,477 | 9/1969 | Battail et al. | 375/97 |
| 3,800,231 | 3/1974 | Pratt | 455/265 |
| 3,859,631 | 1/1975 | Holmes et al. | 375/97 |
| 4,253,189 | 2/1981 | Lemoussv et al. | 375/75 |
| 4,270,221 | 5/1981 | Daniel, Jr. | 329/124 |
| 4,313,139 | 1/1982 | Logie | 455/265 |
| 4,481,489 | 11/1984 | Kurby | 375/120 |
| 4,514,855 | 4/1985 | Lang et al. | 375/97 |
| 4,568,888 | 2/1986 | Kimura et al. | 375/120 |
| 4,584,710 | 4/1986 | Hansen | 455/265 |

Primary Examiner—Robert L. Griffin
Assistant Examiner—Stephen Chin

[57] ABSTRACT

A signal acquisition circuit for a synchronous receiver that requires frequency sweep to acquire a digitally modulated signal but tends to false lock onto data sidebands or for a receiver that cannot use a frequency discriminator because of wideband noise. The receiver must provide a phase error output signal and also a signal-acquired indication that does not assert during false locks. The circuit comprises an integrator selectively coupled either to the phase error signal or to a square wave sweep waveform used for signal acquisition. The integrator is controlled by a detector output analysis circuit that compares the envelope of the signal received during frequency sweeps with the peak of the envelope determined from successive sweeps by a peak detector with a long time constant. The circuit avoids false locks and continues to sweep through successive false locks until the signal-acquired indication asserts to indicate true lock.

4 Claims, 6 Drawing Figures

FAST ACQUISITION CIRCUIT FOR SYNCHRONOUS DIGITAL RECEIVER OPERATING IN WIDEBAND NOISE

BACKGROUND OF THE INVENTION

1. Field of The Invention

The invention relates to synchronous (synonymous with "coherent") communication receivers demodulating digital information from an amplitude-, phase- and/or frequency-shift keyed signal. In particular, the invention relates to such receivers which must first determine the carrier frequency of the signal to be received (this is called "frequency acquisition"), from within a frequency band which is much wider than the signal spectrum.

2. Description of The Prior Art

The frequency acquisition process is frequently unacceptably slow. When the signal is weak, but still perfectly useable, it is possible that the wideband noise power will be significant in comparison to or even greater than the signal power. Finally, coherent receivers for frequency-shift keying or continuous-phase frequency-shift keying usually require joint acquisition of clock and carrier, which in turn demands very slow frequency sweeping once coarse frequency acquisition has been made. The acquisition time may be greater than several seconds, which is longer than users of microwave radios are accustomed to. In addition, this slow frequency sweeping invites false receiver locks onto data sidebands.

This field of receiver design and its associated problems have recently been commercially realized with the new low-cost point-to-point digital radio systems for telecommunications. These systems employ lower data rates and higher carrier frequencies than have previously been used in the industry. The higher carrier frequencies and economical transmitter designs lead to larger carrier frequency drifts. At the same time, the lower data rates require correspondingly narrower signal spectra to obtain good communication efficiency. Good communication efficiency is a prime requirement at these higher carrier frequencies where transmitter power is expensive and atmospheric attenuation necessitates large fade margins. The result is that the carrier frequency drift is now the predominant contributor to the IF bandwidth requirement, being much larger than the signal spectrum. For example, consider a typical radio system communicating 1.544 Mb/sec on a minimum-shift-keyed carrier of 23 GHz, with the transmitter and receiver first local oscillator each contributing a frequency tolerance of 0.03%. The frequency drift is 2 times 0.03% of 23 GHz, which is 13.8 MHz. Since this may be in either direction, the IF bandwidth required to contain the frequency drift is twice this, or 27.6 MHz. At the same time, 99% of the signal power is contained in a bandwidth 1.2 times 1.544 MHz which is 1.85 MHz, very small by comparison. False receiver locks will occur at three or more frequencies on each side of the actual carrier, spaced in multiples of 772 KHz from the carrier.

There are, however, three characteristics of the commercial single-channel-per-carrier digital radio environment which may be exploited. First, receivers require 8 decibels or more of energy-per-bit to noise-density ratio (Eb/No). Second, they require ten or more decibels of signal-to-intereference power ratio (C/I). These two constraints on system design insure that the signal power spectral density will exceed the noise power spectral density by eight decibels or so in a narrow band centered on the carrier frequency, and that interfering signals in the frequency band to be searched will be ten decibels or so less in power than the desired signal. Third, receivers may be designed with signal-acquired indicators which are immune to false locks.

Until recently, commercial digital radio systems have had carrier frequency drifts very small in comparison with their signal spectrum; hence the intermediate frequency (IF) bandwidth has not needed to be much larger than the signal spectrum. In this regime, the signal-to-noise ratio at the output of the IF amplifier is at least ten decibels or so and the conventional frequency discriminator has been very succesfully used to aid in coarse-tuning the frequency in preparation for phase-locking by the local carrier oscillator.

Systems such as the 23 GHz radio described above have sometimes used the frequency discriminator in spite of its inherent difficulties, with the frequent failure to acquire weak signals in a very sensitive receiver. In addition, in synchronous systems the problem of escaping the false locks, which surround the true lock in a coherent receiver, does not seem to have been satisfactorily solved.

SUMMARY OF THE INVENTION

Accordingly, it is an object of the present invention to provide a fast signal acquisition circuit for synchronous digital receivers.

It is a further object of this invention to provide a circuit for acquisition of signals from within a frequency band much wider than the signal spectrum.

It is a further object of this invention to provide a circuit for acquisition by receivers which may require very slow frequency sweeping once coarse frequency acquisition has been made.

It is a further object of this invention to provide an acquisition circuit for receivers which have a propensity to false-lock onto data sidebands of the desired signal.

These and other objects of the invention are achieved in a novel signal acquisition circuit adapted to work in conjunction with a wide variety of digital signals and applicable to synchronous digital receivers.

The novel acquisition circuit involves one of the product detectors ("I" or "Q"), the voltage controlled oscillator (VCO) normally used for carrier regeneration, and the integrator used to control the VCO in the synchronous digital receiver. In accordance with the invention, the circuit also comprises a sweep oscillator and means for switching the integrator input from the phase detector output used in normal operation to the sweep oscillator used during acquisition. The novel circuit also comprises several components which are added to the synchronous digital receiver for signal acquisition. These include a low-pass filter, a rectifier, a low-pass envelope filter, an envelope peak memory, a comparator, an astable multivibrator and a logical OR gate. The low-pass filter is used to eliminate the wideband noise. The astable multivibrator is used to provide an interval of slow frequency sweeping during which the receiver will lock, and also to terminate false locks.

The circuit operates by successively frequency-sweeping the wide IF spectrum including signal and noise, estimating the frequency of the peak of the signal envelope with each sweep. A memory of the estimated peak signal amplitude is updated with each sweep and used in making the next estimation. False locks onto data sidebands are terminated after a fixed duration.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings, described below:

FIGS. 2A and 2B are waveforms illustrating the operation of the signal acquisition circuit.

DESCRIPTION OF THE PREFERRED EMBODIMENT

Figure 1:
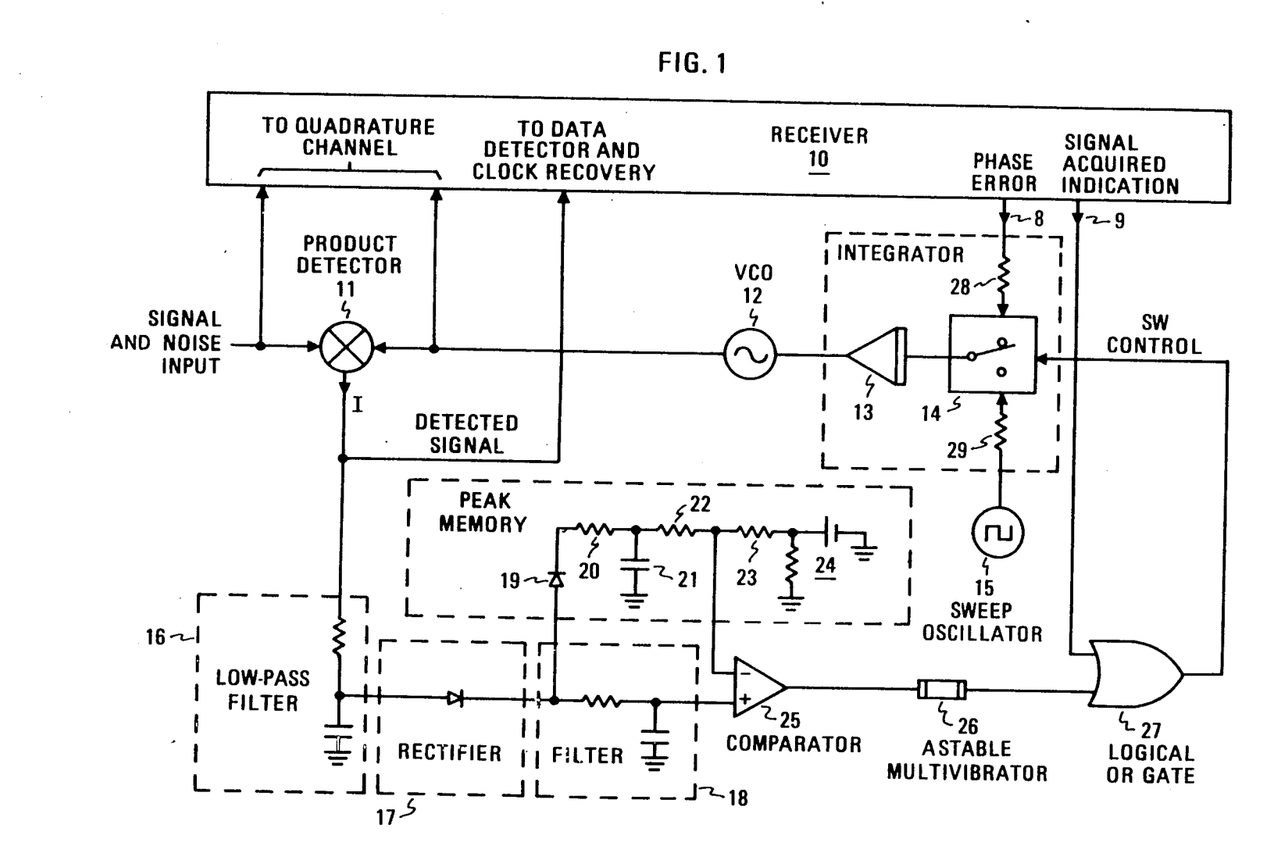
FIG. 1 is a simplified block diagram of the signal acquisition circuit as part of a synchronous digital communication receiver requiring frequency-sweep acquisition.

FIG. 1 is a simplified block diagram of the signal acquisition circuit as part of a synchronous digital communications receiver requiring frequency-sweep acquisition. Block 10 signifies those parts of the receiver which are not integral to the signal acquisition circuit but which are interconnected at five points to the signal acquisition circuit. Output signals from this part of the receiver which are used by the signal acquisition circuit emerge from the phase error terminal 8 and the signal-acquired indicator terminal 9. Blocks 11-15, which form an integral part of the signal acquisition circuit, are parts of a conventional receiver design. These are the product detector 11, VCO 12, integrator 13, operate/sweep switch 14 and sweep oscillator 15. Blocks 16-27 are new components which have been added to implement the signal acquisition circuit. These are a low-pass filter 16, rectifier 17, envelope filter 18, envelope peak memory comprising components 19-24, comparator 25, astable multivibrator 26 and logical OR gate 27.

Block 10, the synchronous digital communications receiver used in the system, may take the form appropriate to the type of digital modulation to be received. These modulations include the well-known and well-used family of amplitude-, phase- and/or frequency-shift keyings. Receivers for these modulations include a pair of product detectors which demodulate the received signal by heterodyning with a locally-generated carrier reference. The carrier coupled to one of the detectors is in phase quadrature with the carrier coupled to the other detector. Thus the two detectors are commonly referred to as I and Q (in-phase and quadrature) detectors. The output of one of these detectors is used by the present novel signal acquisition circuit. This detector output is also coupled to the non-included, block 10, parts of the receiver, where it may actuate the data detector, integrate-and-dump, clock recovery etc., as well as to the low pass filter associated with the signal acquisition circuit. The other detector is not associated with the signal acquisition circuit and has therefore been included in the receiver block 10. The figure shows that the I detector is the one used by the signal acquisition circuit and the Q detector is the one included inside the receiver block 10, but the signal acquisition circuit would work just as well with the Q detector, i.e., if the labels I and Q in the figure were interchanged.

These receivers also include a phase-error detector circuit which generates a voltage proportional to any error in the phase of the locally-generated carrier reference. This signal is coupled at output terminal 8 to the normal/sweep mode switch 14 which is located outside of block 10. A signal-acquired indicator output terminal 9 is also shown on the receiver. The circuitry generating this binary output may take a variety of forms and must be appropriate to the particular type of modulation being received. The behavior required at this terminal by the signal acquisition circuit, however, may be concisely stated: It must indicate its ACQUIRED state, say logical HIGH, only when true lock onto the desired incoming carrier has been obtained and its other state at all other times, particularly when the receiver is false-locked.

Blocks 11-15 are parts of the well-known receiver which are used as an integral part of the signal acquisition circuit. The incoming signal and noise are shown coupled to the linear input of product detector 11. In superheterodyne receivers, these will have been converted to an intermediate frequency (IF) and are usually coupled from the output of an IF amplifier. The local-oscillator input terminal of the product detector 11 is coupled from the voltage-controlled oscillator (VCO) 12. The term "VCO" is used loosely and is intended to include variable frequency oscillators controlled by current or some other electronic phenomena, as well as voltage which is usually the most convenient. This product detector input may be a square wave or other nonsinusoidal waveform which is rich in harmonics, or it may be treated as such, i.e. limited, by the product detector. The detected signal output is the product of the two inputs in the time domain, which is equivalent to the set of their sums and differences in the frequency domain.

Figure 3A:
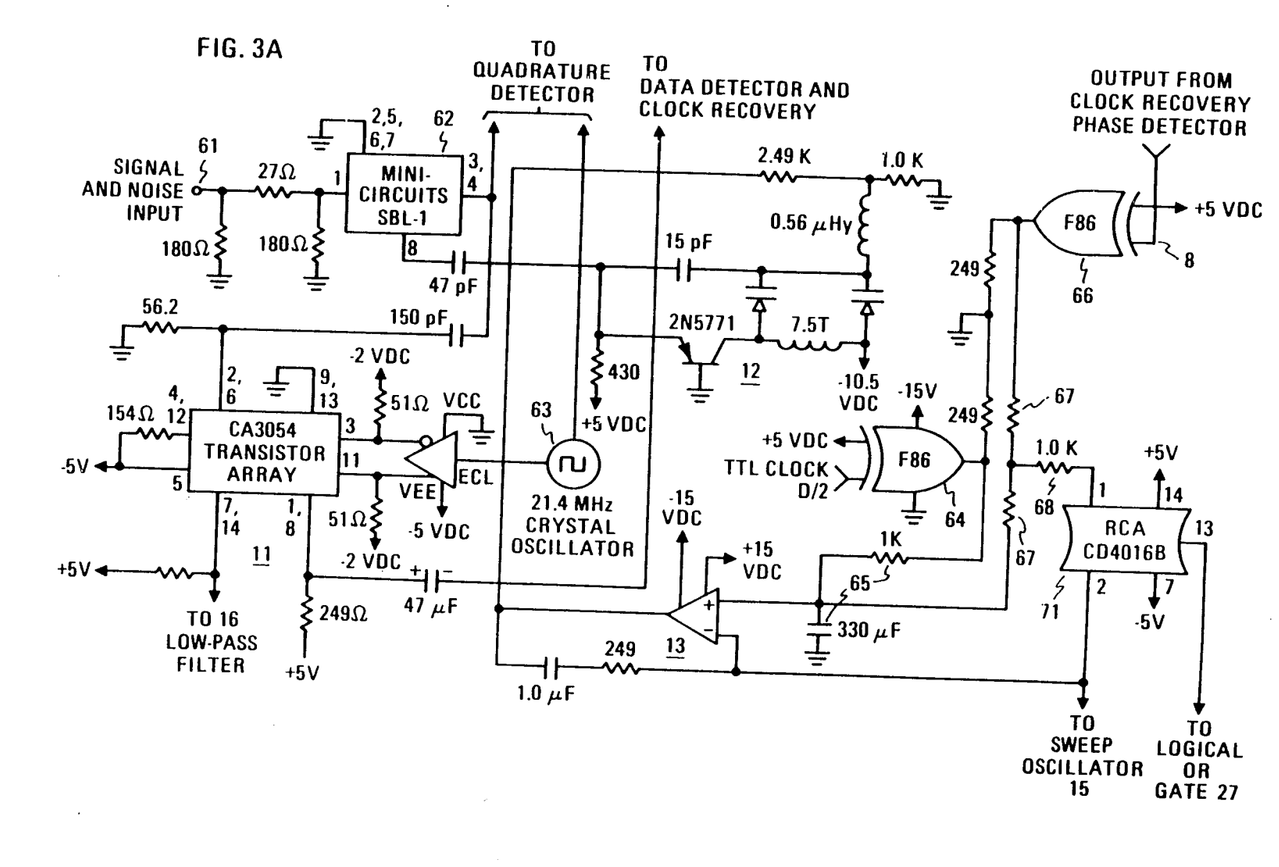
FIGS. 3A and 3B are parts of a schematic diagram of the preferred embodiment of the signal acquisition circuit, showing the principal electrical components, their identification or circuit values.
Figure 3B:
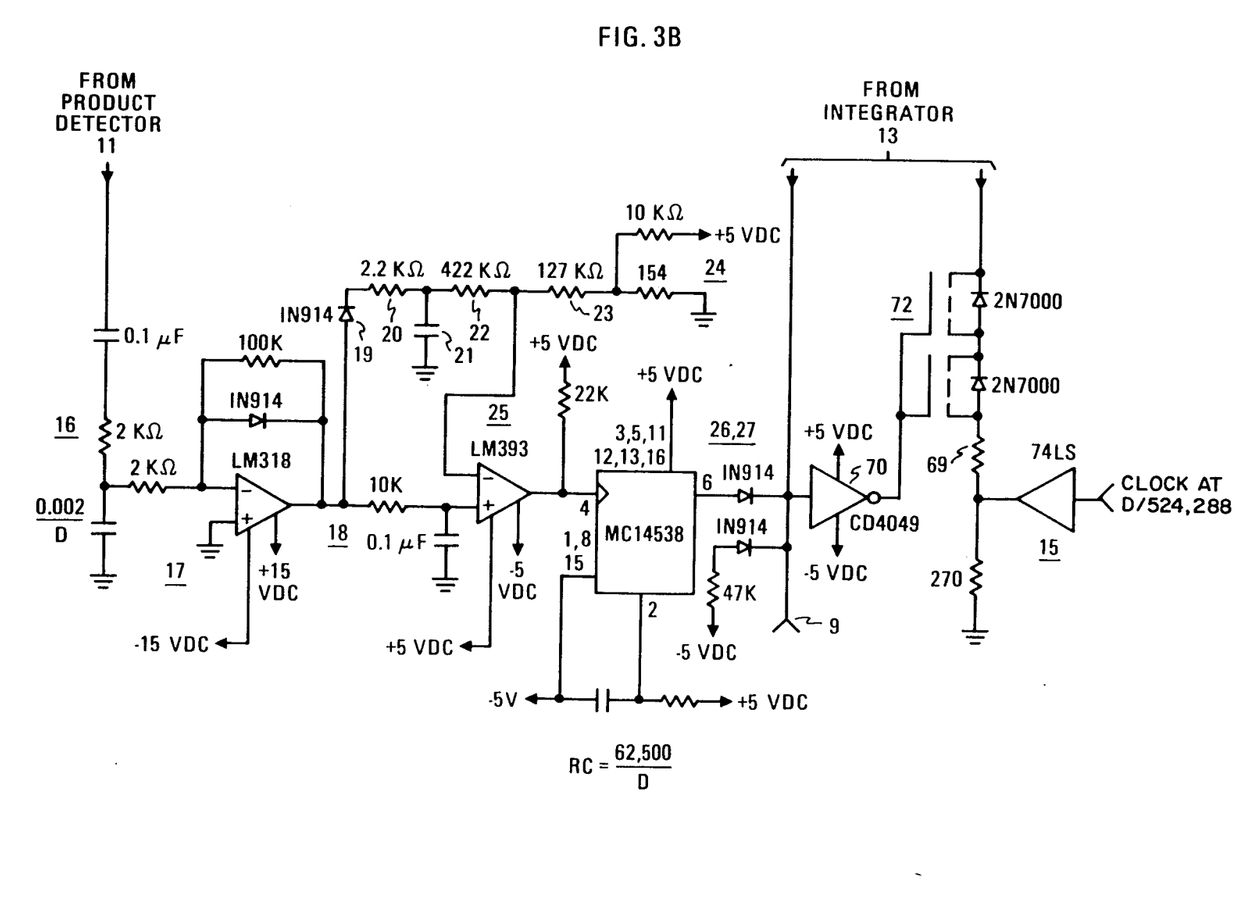

The detected signal output of 11 is coupled into the receiver portion 10 and to low-pass filter 16. If, as is usually the case, this signal is coupled to another passive lowpass filter inside the receiver, then the detector must be designed so that these two filters do not interact with one another. For example, the two separate outputs of a differential amplifier may be used, as shown in the more detailed FIG. 3.

The VCO 12, which is the second member of this portion of the signal acquisition circuit, should have a frequency range designed to embrace the range of possible input signal carrier frequencies and an output frequency which is approximately a linear function of the control potential. The VCO 12 is controlled by a voltage supplied from the integrator 13.

The integrator 13 receives its integrand in the NORMAL and SWEEP modes via analog-signal switch 14, these being the third and fourth members of the group. When the switch control input is in the NORMAL mode, the integrand is the phase-error signal 8 from the receiver phase error detector. The resistor 28 may be used to fix the bandwidth of the carrier-tracking loop which is composed of the phase-error detector, resistor 28, integrator 13, VCO 12 and product detector 11.

When the switch control input (from gate 27) is in the SWEEP mode, the integrand is the output of the sweep oscillator 15, which is a square wave at the desired sweep frequency via the resistor 29. The sweep frequency and the value of resistor 29 are chosen as follows: First, the maximum sweep rate at which the receiver can usually lock onto a signal as it is sweeping by is determined. (The word "usually" acknowleges that receiver acquisition depends on the instantaneous phase and frequency of the oscillator to be synchronized and the data pattern at the time the signal is encountered by the sweeping receiver, and these are, for most design purposes, random parameters.) The input current to the integrator required to cause this rate of VCO frequency sweeping is determined. Then the sweep-oscillator output voltage and the value of resistor 29 and the integrator required to cause this current are determined. Finally, the frequency of the sweep oscillator is determined by equating its half-period to the quotient of the VCO range (in Hertz) divided by the VCO sweep rate (in Hertz per second). Although the circuit is easiest to understand when an independent sweep oscillator is used, the square wave which it is required to generate may be obtained from another source. In the preferred embodiment, in fact, the output of the crystal oscillator in the receiver clock recovery circuit is divided by two to the nineteenth power (524,288) to obtain the desired square wave which is coupled to the resistor 29 in place of the sweep oscillator 15. This is convenient because the preferred embodiment was required to operate over a thirty-to-one range of data rates with minimal component changes and the maximum sweep rate was found to be inversely proportional to the rate of the transmitted data. Thus, only the value of resistor 29 needs to be changed with the data rate in this part of the circuit; the sweep oscillator frequency change is taken care of along with the frequency of the crystal oscillator in the receiver clock recovery circuit.

The elements 16–27, which are in a path between the output of detector 11 and the mode control switch 14, determine whether the acquisition circuit is in the NORMAL or SWEEP mode. The function they perform is one of analysis of the detector output. They are the "brains" of the signal acquisition circuit. The waveforms which result during this process are illustrated in FIGS. 2A and 2B.

Blocks 16 and 17, the first elements of this group, generate a dc voltage proportional to the signal amplitude. The detected signal is coupled to low-pass filter 16 which should have a cutoff frequency small enough to resolve the various lobes of the signal spectrum but large enough so as not to be substantially affected by instantaneous data patterns when the signal is swept. For acquiring minimum-shift keyed signals, a good cutoff frequency has been found to be 0.085 times the rate of transmitted data in bits per second. The output of the low-pass filter 16 is represented by the first (uppermost) waveform 33, 43 illustrated in FIGS. 2A and 2B. If a diode is used as signified in block 17 to rectify the signal, the signal amplitude must be large enough to swamp the effect of its barrier potential. While the receiver is in the sweep mode, blocks 16 and 17 may be thought of as the vertical amplifier of a spectrum analyzer with a resolution bandwidth equal to the cutoff frequency of low-pass filter 16, sweeping the received signal-plus-noise spectrum. It is, in fact, this spectral envelope which is subsequently processed by the next element in the detector output analysis portion of the signal acquisition circuit.

Figure 2A:
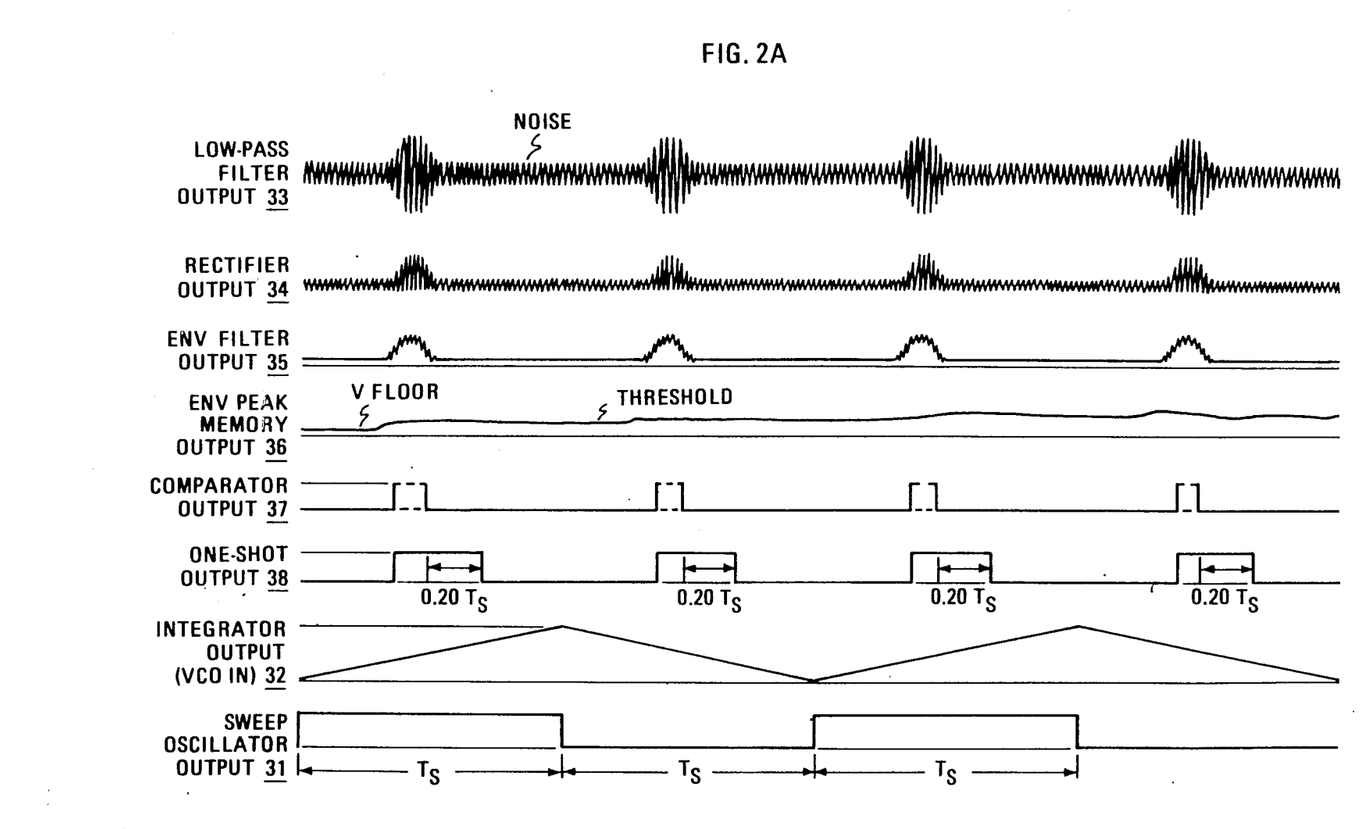
FIG. 2A being hypothetical and showing what would happen if the circuit were forced to operate in the "sweep mode", and FIG. 2B showing the sequence of a typical signal acquisition when the circuit is allowed to operate normally.
Figure 2B:
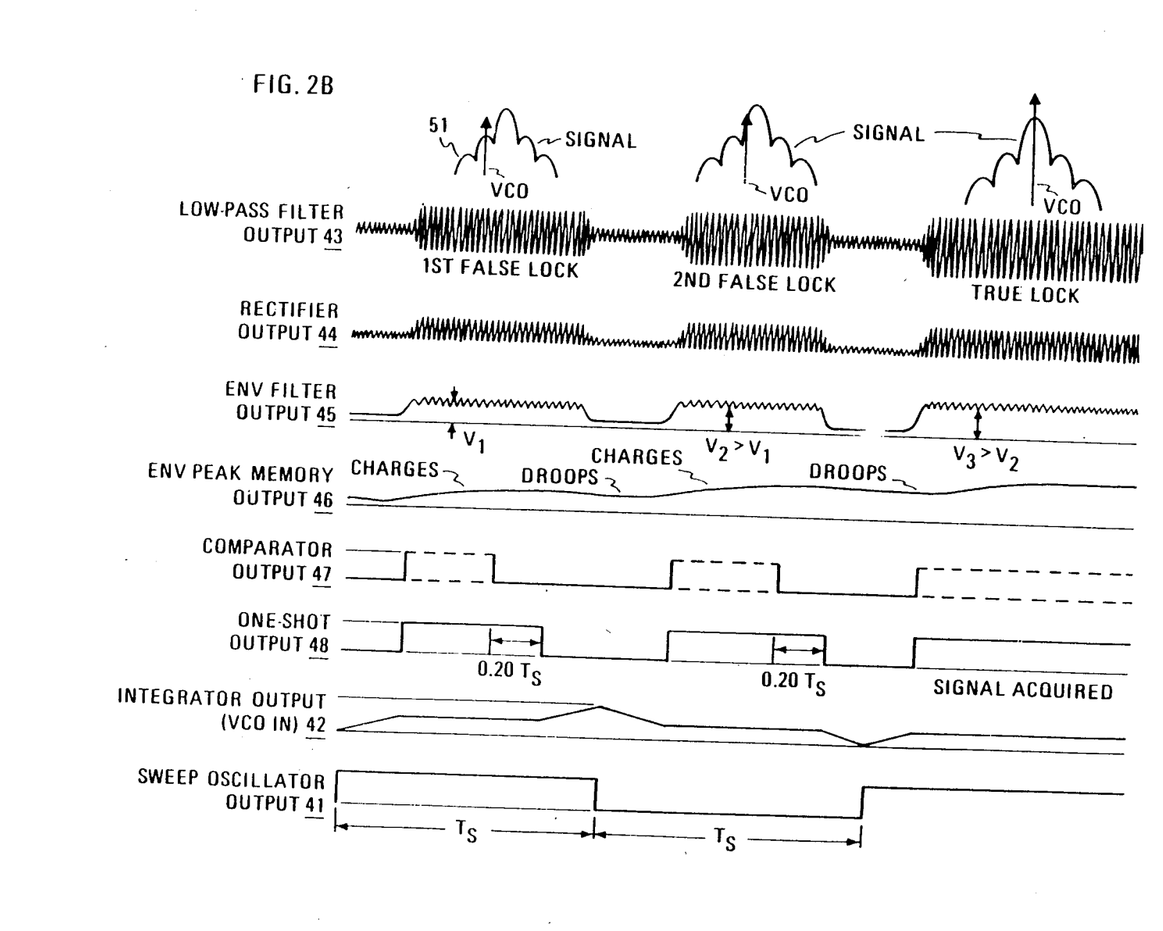

The rectified signal, which is represented by the second waveform 34, 44 in FIGS. 2A and 2B, is fed to low-pass filter block 18 the next element in the detector output analysis portion. It is in element 18 that the envelope of the swept spectrum is finally developed. Continuing the previous analogy, this is the video filter of the spectrum analyzer. The time constant of this filter affects the desired time constant of the envelope peak memory to be described subsequently, but it is not, by itself, very critical. A time constant of one millisecond has been found to be satisfactory for acquiring minimum-shift keyed signals with transmitted data rates of between 320 and 10,000 kilobits per second. The envelope filter output is represented by the third waveform 35, 45 in FIGS. 2A and 2B.

Components 19–24 compose the envelope peak memory of the detector output analysis portion. This circuit resembles the peak detector, rectifier and filter often used in automatic gain control amplifiers. It develops a dc output voltage which is proportional to the average amplitude of previous peaks. In addition, it adds a small dc bias. This may be understood by referring to the resistor values: Resistor 20 is 2.2 kilohms, resistor 22 is 422 kilohms and resistor 23 is 127 kilohms. The action of diode 19 and the much smaller value of resistor 20 in comparison with the other two causes capacitor 21 to charge much faster than it discharges; this is the essence of the "peak memory." The discharge time constant of capacitor 21 into resistors 22 and 23 in series must be properly chosen. For acquiring minimum-shift keyed signals a good time constant has been found to be the quotient of 330,000 divided by the transmitted data rate. Voltage source 24 is to provide a lower limit for this circuit. The output of the envelope peak memory is called the threshold voltage and is coupled to the inverting input of comparator 25. It is represented by the fourth waveform 36, 46 in FIGS. 2A and 2B.

Comparator 25, the next element in the detector output analysis portion, may be an integrated circuit. It compares the signal envelope, from the envelope filter 18, with the threshold from the envelope peak memory 19–24 and develops a binary output which is high when the signal envelope exceeds the threshold. During sweep-mode operation, the effect is to produce a high output whenever the signal envelope exceeds what was previously remembered as the peak of the signal envelope.

The output of comparator 25, which is represented by the fifth waveform 37, 47 in FIGS. 2A and 2B, is coupled to the trigger input of astable multivibrator 26, the next element in the sequence. This device produces an output pulse of fixed duration in response to a positive-going input transition. During sweep-mode operation, this occurs when the preceding comparator has located a peak of the signal envelope; thus it serves to stretch the indication of envelope peak from the comparator. Subsequent envelope-peak indication from the comparator during the fixed duration causes the multivibrator timer to reset so that the output pulse continues for the fixed duration after the last positive-going input transition. The length of the fixed duration is not very critical; twenty percent of the time taken for the VCO 12 to be swept from one end of its range to the other works well for the acquisition of minimum-shift keyed signals. The output of one shot or astable multi-vibrator 26 is represented by the sixth waveform 38, 48 of FIGS. 2A and 2B.

The stretched envelope-peak indication and the signal-acquired indication from the receiver are coupled to the two inputs of logical OR gate 27. Its output is coupled to the analog-switch so as to cause the system to enter the NORMAL mode when a peak of the signal envelope has been located. In addition, if the receiver indicates ACQUIRED during this time, the output of gate 27 remains high due to this latter input and the receiver remains latched in the NORMAL mode.

The FIG. 2A waveforms 31-38 occur at the designated points of the detector output analysis circuit under conditions of "open loop" operation; that is, when the output of logical OR gate 27 is negated, which forces analog-switch 14 to stay in the SWEEP mode and couple, the sweep oscillator 15 to integrator 13. The common abscissa of FIG. 2A is time, and all of the ordinates are voltage. These waveforms will now be reviewed in the context of the assumed conditions.

The lower most waveform in FIG. 2A, labeled 31, is the square-wave output of the sweep oscillator 15. The sweep time TS is chosen as explained earlier. The output of integrator 13 is the integral of the square wave and is drawn as the triangle wave 32. As this is the control voltage to VCO 12, the ordinate of this waveform may also be interpreted as the instantaneous VCO frequency. Each half-cycle of this waveform, of duration TS, is referred to as a "sweep," in that the VCO is swept over its complete range, albeit in opposite directions during successive sweeps. Waveform 33 is the output of lowpass filter 16. The bump of high amplitude seen near the middle of each sweep is the signal which the circuit is expected to acquire. The low-amplitude areas in between are noise. Waveform 34 is the output of rectifier 17 and waveform 35 is the output of envelope filter 18 under these conditions. Here again, the analogy to the spectrum analyzer is clear; waveform 35 is the trace that would be seen on the analogous spectrum analyzer.

At this point some of the conditions necessary for proper circuit operation may be stated. In general, the signal desired to be acquired must stand out as shown in waveform 35. Specifically, the peak of the signal power spectral density must be at least 6-8 decibels above the background noise density. In addition, interfering signals within the swept frequency range should be at least 10 decibels below the desired signal power. These conditions are ordinarily met in single-channel-per-carrier, point-to-point digital radio systems requiring 8 or more decibels in the ratio of received signal energy per bit to noise (Eb/No) and coordinated with 10 or more decibels in the ratio of signal to interference (C/I).

Waveform 36 is the output of envelope peak memory 19-24. This is also referred to as the comparator threshold voltage. The drawing assumes that capacitor 20 is initially uncharged. The initial voltage is then VFLOOR as supplied by voltage source 24. Rectifier output due to the background noise is insufficient to forward-bias diode 19. The first encounter with the desired signal, however, increases the charge on capacitor 21 which is reflected in the increment in the threshold 36. A slight droop occurs due to the longer discharge time constant until the signal is again encountered during the next sweep. The charging and discharging of capacitor 21 is in accordance with the respective time constants explained in the description of FIG. 1. The charge on capacitor 21 and hence the threshold voltage 36 continue to increase slightly for several sweeps, gradually reaching an equilibrium as shown at the right-hand end of FIG. 2A.

Waveform 37 is the output of comparator 25. Precisely, it is high whenever the envelope filter output 35 exceeds the threshold 36 and is low otherwise. The random high/low transitions seen during the encounter with the signal during each sweep are caused by the random fluctuations in envelope filter output 35, which are in turn caused by the fluctuations in the instantaeous signal spectrum, which are in turn caused by the random pattern of transmitted data. These fluctuations could be reduced by reducing the cutoff frequency of envelope filter 18, which is analogous to reducing the video bandwidth of the spectrum analyzer in the previous analogy. It has been found, however, that this reduction in resolution adversely affects circuit operation, resulting in increased average acquisition time even after the other affected design parameters have been re-optimized.

Waveform 38, the multivibrator 26 output, shows how these fluctuations are effectively filtered by the multivibrator, cleaning up the logical output without reducing resolution in the peak detection time estimation. As explained in the description of FIG. 1, the multivibrator output pulse continues for 0.20 times TS after the last positive-going comparator output.

FIG. 2B is a rerun of FIG. 2A representing the same circuit points but this time with the logical OR gate output connected to the control input of analog-switch 14 as in actual operation. The reference numerals of the individual waveforms in FIG. 2B are displaced 10 digits from the waveforms of FIG. 2A, i.g., 41 corresponds to 31; 42 to 32, etc. The receiver is now switched into the NORMAL mode whenever the envelope filter output 45 exceeds the threshold 46. Capacitor 21 is again assumed to be initally uncharged; thus the threshold is relatively low and is exceeded when the VCO is still on a signal spectral sidelobe as shown in spectrum plot 51. Because the VCO stops sweeping, the waveforms 43, 44 and 45 remain stationary due to the signal power at this sidelobe. In practice, the coherent receiver will quickly pull the VCO to the nearest lock frequency when the receiver is switched into the NORMAL mode and the phase error signal from the receiver is allowed to reach integrator 13. During the first few sweeps after the transmitter or receiver is powered-on, this will ordinarily be a false lock because the threshold is set low and is crossed while the VCO is still on a signal sidelobe, far from the carrier frequency and desired true lock. However, the threshold increases while the receiver is false-locked due to capacitor 21 being charged by signal sidelobe envelope power via diode 19 and resistor 20. It eventually increases past the envelope filter output 45, causing comparator output 47 to remain low and one-shot output 48 to also go low after its fixed pulse duration of 0.20 times TS. Unless the receiver has truly ACQUIRED the signal, indication 9 remains low and OR gate 27 output returns to the low state, switching analog-switch 14 back to the sweep mode and allowing the receiver to continue sweeping. This is shown to happen twice in FIG. 2B. The second time the sweep is interrupted, the threshold crossing occurs closer to the desired carrier due to the higher threshold voltage 46 caused by the substantial charge added to capacitor 21 during the false-lock on the previous sweep. The threshold is set even higher on the third sweep, high enough, in fact, that the receiver is switched to the NORMAL mode when the VCO is very close to the actual carrier, and true-locks onto it before the multivibrator pulse 48 terminates. The ACQUIRED indication from the receiver 9 must be asserted during this time, so that the OR gate 27 output remains asserted and the analog-switch 14 remains effectively latched into the NORMAL mode. This concludes the useful activity of the signal acquisition circuit.

The description in the previous paragraph is somewhat idealized, describing a situation where the acquisition is necessary due to transmitter and receiver power-on and occurs straightforwardly. The actual chain of events depends on the charge on capacitor 21 when the SWEEP mode is initiated, the position of the desired signal on the frequency axis, its overall amplitude, the instantaneous signal spectrum due to the random transmitted data during various sweeps, the phase of the sweep oscillator, and the contribution of interfering signals to the spectrum. The first aberration, which has been seen to occur quite often in practice, is that too much charge may be added to capacitor 21 during a false lock so that the threshold is set above the peak of envelope filter output 45 during the next sweep. The signal is swept completely by without the receiver being switched into the NORMAL mode. This will happen until the discharge of capacitor 21 through resistors 22 and 23 is sufficient to reduce the threshold below the peak of envelope filter output 45. True lock and receiver acquisition often occurs at this time, but the threshold may have discharged too low during a sweep so that the next signal encounter produces a false lock. The previous aberrations may be thought of as "overshoot" and "undershoot" of the threshold voltage, respectively.

Another phenomenon occurs when the receiver is operating normally and the signal is momentarily interrupted: the threshold voltage is set very high by the presence of strong signal envelope voltage at the anode of diode 19 and must discharge, which generally takes several sweeps, before the threshold is low enough to be crossed by the envelope filter output due to encountering the restored signal during a subsequent sweep.

Once all the time constants have been properly set, however, the threshold will be in the right place at the right time. The aforementioned aberrations serve only to decrease the probability that signal acquisition will occur on a given sweep and to increase the average acquisition time. When the time constants set forth in this description are used to acquire minimum-shift keyed signals, the circuit is "stuck-proof" with good margins and always acquires the signal eventually.

FIGS. 3A and 3B form a schematic diagram of the preferred embodiment of the signal acquisition circuit used to acquired minimum-shift-keyed (MSK) data signals at data rates of between 320 kilobits per second and ten megabits per second. All of the blocks shown in FIG. 1 are shown in detail in FIG. 3. The remainder of the receiver, the part which is not a part of the signal acquisition circuit symbolized as block 10 in FIG. 1, is not shown in FIG. 3 either.

The demodulation chain is shown in FIG. 3A. The signal and noise input is coupled to terminal 61. This embodiment is designed to demodulate MSK signals input at a frequency of 230 MHz plus or minus 15 MHz. (This wide uncertainty motivates the use of the rapid signal acquisition circuit herein described) to within the ending parenthesis mark. The signal source impedance is 50 ohms and the level should be about −15 dBm, but the signal acquisition circuit (and the rest of the receiver) will operate with a signal level more than 7 dB either above or below this nominal level. It is the adaptive nature of the threshold voltage described above which makes this wide dynamic range possible. (Mixer 62 is not shown in the block diagram of FIG. 1.) In the preferred embodiment of FIGS. 3A and 3B, it was found that circuit components could be used more effectively if another stage of conversion were added. With an input signal of 230 MHz, the VCO 12 shown below and to the right of the mixer 62 in FIG. 3 operates at 208.6 MHz, resulting in a 21.4 MHz signal product at the output of mixer 62. The final downconversion is obtained by heterodyning with a fixed crystal oscillator 63 operating at 21.4 MHz. The 21.4 MHz local oscillator signal is coupled to the product detector via emitter-coupled-logic. Product detector 11 (lower left in FIG. 3A) is realized in FIG. 3 as the CA3054 transistor array together with bias resistors, operating as a double-balanced wideband mixer. It has complementary outputs from the collectors of its differential output stage. One output is coupled to the circuits necessary in the rest of the receiver, namely a passive low-pass "I-arm" filter followed by data detector and clock recovery. The other output is coupled to the low-pass filter 16 used for the signal acquisition circuit. This arrangement proved to be a convenient way of keeping these two filters from interacting with one another.

The circuitry labeled 17–26 produces the stretched envelope-peak signal. The quantity "D" is introduced in the detailed sketch of low-pass filter 16 in the embodiment of FIG. 3A, 3B. This refers to the transmitted data rate; i.e. if the transmitted data rate is ten megabits per second then D is 10,000,000. The capacitance values are given in farads. Thus, for example, with a transmitted data rate of ten megabits per second the capacitor in the low-pass filter 16 should be 0.002/10,000,000 farad which equals 200 picofarads. The rectifier labeled 17 and symbolized by a single diode in FIG. 1 is actually a rectifier and amplifier with a voltage gain of 50 in the preferred embodiment of FIG. 3A, 3B. It is expected that this gain will be desirable in most practical embodiments so that lower level signals can be used to make an economical demodulation chain while higher levels are used here in the video processing to swamp out diode forward biases and dc offsets. Recalling that low-pass filter 16 has a bandwidth of 0.085/D, the signal spectrum passing through this amplifier has significant energy up to a few megahertz at the maximum 10 megabit per second data rate so that a wideband amplifier such as the LM318 should be used. The amplifier and rectifier 17 are shown coupled to the envelope filter 18 which has its one millisecond time constant realized using a 10,000 ohm resistor and one tenth of a microfarad capacitor. The amplifier and rectifier 17 are also shown coupled to the envelope peak memory 19–24 which is the same as shown in FIG. 1 except that the voltage source VFLOOR has been realized using a low output resistance voltage divider having an output voltage of VFLOOR equal to 76 millivolts dc. The filtered envelope and threshold are coupled to the comparator 25 and then to the astable multivibrator 26 as in FIG. 1. The MC14538 astable multivibrator has its output pulse duration fixed equal to the product of the resistor R and capacitor C connected to its pin 2 as shown in FIG. 3A, 3B. The formula shown, RC=62,500/D, will give the desired duration equal to 0.20 times the sweep time when R is in ohms and C is in farads.

The signal ACQUIRED output 9 from the receiver is obtained from the lock indication of the phaselock loop recovering clock from one of the demodulated eye patterns. This is explained in the subsequent FIG. 4. Because a coherent MSK receiver cannot recover the carrier without recovering the clock, and cannot recover the clock without recovering the carrier, the positive indication of clock acquisition also indicates carrier acquisition. This fact has been exploited here. The stretched envelope-peak indication output from multivibrator 26 and the ACQUIRED indication are coupled to logical OR gate 27, realized here using two diodes and a pull-down resistor.

As explained in the description of FIG. 1, the sweep oscillator 15 is not an oscillator in the preferred embodiment of FIG. 3A, 3B but is merely a frequency divider which takes advantage of the relatively stable frequency source provided by the voltage-controlled crystal oscillator in the receiver's clock recovery circuit, which is not shown. The recovered clock at the transmitted data rate is divided by 524,288 to obtain a square wave across the 270-ohm resistor at the output of sweep square-wave generator 15 in FIG. 3A, 3B.

FIG. 3A, 3B shows one more practical feature not shown in the simplified block diagram. This is that the reference voltage for the integrator 13 is taken to be the DC average of a 50-percent duty cycle TTL clock, rather than ground. This is because the phase detector is the output of a TTL gate with the phase error given by the duty cycle of the waveform, a 50 percent duty cycle corresponding to zero phase error. The reference voltage is generated by passing a TTL clock at a frequency D/2 through the gate 64 and filtering it through the RC lowpass filter 65. The phase detector output 8 is passed through gate 66. The single resistor 28 of FIG. 1 is shown as the two-resistor "L" voltage divider 67 in FIG. 3. (The resistor values depend on the bandwidth desired for the Costas loop at various data rates.) The "L" arrangement gives better control of dc drifts caused by amplifier offsets for different loop bandwidths. The output HIGH state voltages from the two F-series gates 64 and 66 are equalized due to the loading action of the 249 ohm resistor connected to the output of each. Equivalent loading of the LS-series gate used in sweep generator 15 is provided by the 270-ohm resistor connected to its output. The formula for calculation of resistor 69 (R=1.07×10$^{10}$/D) gives its value in ohms for the proper sweep slope, as explained in the description of FIG. 1. The resistors 68 and 69 are shown coupled to the analog-switch which appears as block 14 in FIG. 1. The corresponding analog-switch in FIG. 3A, 3B is realized by inverter 70, IC CMOS analog gate 71 and FET transistor pair 72. The inverter causes the CMOS gate to be on while the transistor pair is off to give the NORMAL-mode operation. It also causes the CMOS gate to be off while the transistor pair is on to give the SWEEP-mode operation. The transistor pair is used instead of another CMOS gate in the sweep-mode throw of the switch due to the fact that the tolerance in channel resistance of the CMOS gate becomes too significant in comparison to the value of resistor 69 at high data rates to insure reliable operation. As can be seen, the output of logical OR gate 27 is coupled to the control input of analog-switch 70-72 The phase error voltage is coupled through resistor 68 and the sweep oscillator output is coupled through resistor 69. The switch output is coupled to the TL071 operational amplifier with capacitive feedback to realize the integrator 13. The 249 ohm resistor which is also in the feedback path corrects the dynamic response of the carrier recovery loop when the receiver is operating in the NORMAL mode but is too small to have any significant effect in the SWEEP mode. The 2.49K and 1.0K ohm voltage divider coupling the integrator 13 to the VCO 12 retricts the range of the VCO control voltage to between plus and minus 4.5 volts from ground. This in turn restricts the range of VCO frequencies to plus or minus 20 MHz from 208.4 MHz so that the receiver will not sweep into an adjacent channel or force mixer 62 to undesired high-side conversion by allowing the VCO to operate at input signal frequency plus 21.4 MHz instead of minus.

Figure 4:
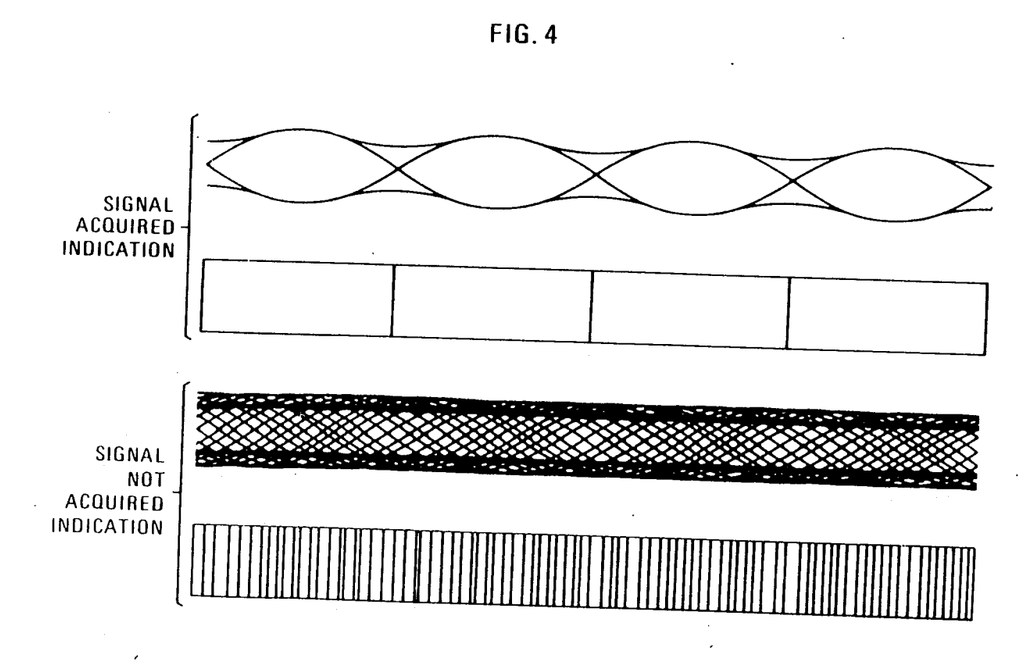
FIG. 4 shows the operation of a typical signal-acquired indicator circuit, which is not itself a part of the present invention and which may take one of several forms, but which as an element of the receiver, provides an essential input signal to applicant's novel signal acquisition circuit.

FIG. 4 shows the operation of a typical signal ACQUIRED indicator in the receiver 10. This signal ACQUIRED indicator operates in the preferred-embodiment coherent receiver for minimum-shift keyed signals. The first line in FIG. 4 shows one of the receiver eye patterns, that is, the waveform present on an oscilloscope with vertical input signal taken from the output of the low-pass "arm" filter following either the I or Q product detectors and with the horizontal sweep triggered by the recovered clock from the receiver. The second line shows the waveform present at the output of a comparator, sometimes called a "data detector" or "bit slicer," to which this eye pattern is ac-coupled. As can be seen, the comparator performs the mathematical signum or "sign" function on the eye pattern input, resulting in a binary output. These two waveforms are those which would be seen after the signal has been acquired. Note how the transitions between the binary states in the second waveform occur in periodic groups, with respect to the synchronism of the horizontal trace which was in turn triggered from the receiver's recovered clock.

The next two waveforms in FIG. 4 show the corresponding cases when receiving noise. The waveform during a false-lock is similar. Note how the transitions between the binary states in the fourth waveform occur at random with respect to the synchronism of the recovered clock. The circuitry detects the difference in transition periodicity between these two cases and provides the necessary binary output (terminal 9 in FIG. 1) to indicate whether the signal has been acquired.

What is claimed is:

1. In a synchronous receiver for receiving a digitally modulated signal having a carrier and a known data rate, said receiver requiring frequency sweep to acquire the digitally modulated signal from within a frequency band that is much wider than the signal spectrum but having the propensity to false lock onto data sidebands spaced from the carrier at multiples of a known frequency interval, or, because of wideband noise, being unable to employ a frequency discriminator function, said receiver comprising:

a product detector, having a signal input to which the digitally modulated signal couples, an oscillator input, and a baseband output;

a variable frequency oscillator, having a control input and an output whose frequency is an approximately linear function of the control input, said output coupled to the oscillator input of the product detector;

means for producing a phase error signal indicating the phase difference between the carrier of the digitally modulated signal and the output of the variable frequency oscillator;

an integrator having an input coupled to said phase error signal and having an output coupled to the control input of the variable frequency oscillator;

means for sweeping the frequency of the variable frequency oscillator at a predetermined sweep repetition rate to acquire the digitally modulated signal, comprising:

a square wave generator for producing a square wave sweep waveform having predetermined amplitude and period and sweep control means for selectively coupling either the output of the square wave generator or the output of the means for producing the phase error signal to the input of the integrator; and a logical signal-acquired indicator, which asserts when the receiver has acquired the digitally modulated signal but which does not assert during false locks, a signal acquisition circuit in said receiver for controlling the sweep control means, comprising:

a first low pass filter, coupled to the baseband output of the product detector, whose cutoff frequency is substantially less than said known frequency interval to remove wideband noise from said baseband output and to produce a filtered baseband output;

a first rectifier means, coupled to the output of the low pass filter, for rectifying the filtered baseband output and producing a rectified baseband output;

a second low pass filter, coupled to the rectifier means and having a cutoff frequency lower than said known data rate and higher than the predetermined sweep repetition rate, for recovering the envelope of the rectified baseband output and producing an envelope signal;

an envelope peak memory for detecting the peaks of the envelope signal and producing an envelope peak memory signal, comprising:

a second rectifier means and capacitor coupled to the output of the first rectifier means and having a discharge time constant several times the period of the square wave sweep waveform and means for establishing a minimum charge on said capacitor sufficient, in the absence of signal but presence of noise, to back bias the first rectifier means, whereby the output of the peak memory means, which is proportional to the charge on the capacitor, eventually increases, in the presence of significant detected signal, from a level less than to a level greater than that of the envelope signal;

comparator means, coupled to the sweep control means, for producing a first logical output when the envelope signal exceeds the envelope peak memory signal and a second, different logical output when the envelope peak memory signal exceeds the envelope signal;

an astable multivibrator, whose output asserts in response to the first logical output from the comparator means and remains asserted for a significant fraction of half the period of the square wave sweep waveform after discontinuance of the first logical output from the comparator means;

a logical OR gate, which has one input coupled to the output of the astable multivibrator, another input coupled to the signal-acquired indicator, and an output coupled to the sweep control means, whereby the output of the astable multivibrator causes the sweep control means to couple the input of the integrator to the output of the square wave sweep generator to attempt signal acquisition or to the phase error signal to test signal acquisition until the signal has been acquired, after which the signal-acquired indicator asserts and causes the input of the integrator to remain coupled to the phase error signal.

2. In a synchronous receiver for receiving a digitally modulated signal having a carrier and a known data rate, said receiver requiring frequency sweep to acquire the digitally modulated signal from within a frequency band that is much wider than the signal spectrum but having the propensity to false lock onto data sidebands spaced from the carrier at multiples of a known frequency interval, or, because of wideband noise, being unable to employ a frequency discriminator function, said receiver comprising:

a product detector, having a signal input to which the digitally modulated signal couples, an oscillator input, and a baseband output;

a variable frequency oscillator, having a control input and an output whose frequency is an approximately linear function of the control input, said output coupled to the oscillator input of the product detector;

means for producing a phase error signal indicating the phase difference between the carrier of the digitally modulated signal and the output of the variable frequency oscillator;

an integrator having an input coupled to said phase error signal and having an output coupled to the control input of the variable frequency oscillator;

means for sweeping the frequency of the variable frequency oscillator at a predetermined sweep repetition rate to acquire the digitally modulated signal, comprising:

a square wave generator for producing a square wave sweep waveform having predetermined amplitude and period and sweep control means for selectively coupling either the output of the square wave generator or the output of the means for producing the phase error signal to the input of the integrator; and a logical signal-acquired indicator, which asserts when the receiver has acquired the digitally modulated signal but which does not assert during false locks, a signal acquisition circuit in said receiver for producing the sweep control signal, comprising:

a low pass filter, coupled to the baseband output of the product detector, for removing wideband noise present in said baseband output and producing a filtered baseband output;

rectifier means, coupled to the output of the low pass filter, for rectifying the filtered baseband output and producing a rectified baseband output;

a low pass envelope filter, coupled to the rectifier means, for recovering the envelope of the rectified baseband output and producing an envelope signal;

an envelope peak memory for detecting the peaks of the envelope signal and producing an envelope peak memory signal, said envelope peak memory having a discharge time constant equal to several times half the period of the square wave sweep waveform, whereby, when the digitally modulated signal appears in the baseband output of the product detector, the envelope peak memory signal initially has a value less than, and eventually has a value greater than, the envelope signal;

means, coupled to the sweep control means, for comparing the envelope signal to the envelope peak memory signal and causing the sweep control means to couple the input of the integrator to the phase error signal when the envelope signal exceeds the envelope peak memory signal and to the output of the square wave generator when the envelope peak memory signal exceeds the envelope signal, and means for coupling said signal-acquired indicator to said sweep control means, whereby, when the signal acquired indicator asserts, it causes the phase error signal to remain coupled to the input of the integrator.

3. The signal acquisition circuit as set forth in claim 2 wherein a dc bias is provided in said envelope peak memory means to offset peak rectified noise and prevent noise from causing said envelope peak memory signal to exceed said envelope signal.

4. The signal acquisition circuit as set forth in claim 3 wherein means are provided to prolong said sweep for a significant portion of the period of the square wave sweep waveform after said envelope peak memory signal has exceeded said envelope signal, to allow said sweep to transit from one false lock to another until the true lock has been acquired.

* * * * *